3,639,562
VAGINAL SUPPOSITORIES AND IMPREGNATED TAMPONS

Maxwell Gordon, Philadelphia, Pa., and Carleton C. Stewart, Turnersville, N.J., assignors to Smith Kline & French Laboratories, Philadelphia, Pa.
No Drawing. Filed Apr. 29, 1970, Ser. No. 33,052
Int. Cl. A61j *3/08;* A61k *9/02, 17/00*
U.S. Cl. 424—28                    11 Claims

ABSTRACT OF THE DISCLOSURE

Contraceptive compositions comprising oxytocin, adenosine triphosphate and ethylene diamine tetraacetic acid in the form of vaginal suppositories and/or impregnated tampons and methods of preventing conception or implantation by inserting in an animal organism said compositions after exposure to conception.

---

This invention relates to novel contraceptive compositions and to methods for preventing conception or implantation by employing said compositions. More specifically the compositions of this invention comprise oxytocin, adenosine triphosphate and ethylene diamine tetraacetic acid, the latter two in the form of alkali metal salts, as the active ingredients. The dosage forms for using these compositions are vaginal suppositories and/or impregnated tampons.

The compositions of this invention have advantages over systemic contraceptive agents in being locally applied, post-coitus, using relatively non-toxic ingredients. The active ingredients are designed to produce a spermicidal and ovocidal effect without damage to fixed tissue.

The contraceptive activity of the compositions of this invention is measured by the ability of the compositions to prevent conception or implantation in rabbits. The compositions are evaluated by first mating 24 adult female rabbits with suitable males. The female rabbits are then divided into two groups of 12 each, and one group is observed for 28 days as the controls. At least 83% of these rabbits should bear litters. The experimental group is treated after mating with the vaginal suppository and/or tampon composition in accordance with the method of this invention and then observed for 28 days. The number of litters produced in the experimental group will be reduced by at least 67%.

The novel contraceptive compositions of this invention, in suitable dosage forms, comprise oxytocin, adenosine triphosphate disodium salt, trisodium salt of ethylene diamine tetraacetic acid and disodium salt of ethylene diamine tetraacetic acid. These compositions are prepared in the form of a vaginal suppository and/or tampon by incorporating amounts of the active ingredients sufficient to prevent conception or implantation, without limiting side effects, with a nontoxic conventional carrier according to accepted procedures. Preferably the compositions will contain, per dosage form, from about 1 μg. to about 1000 μg. of oxytocin, from about 1 mg. to about 1000 mg. of adenosine triphosphate disodium salt, from about 10 mg. to about 1000 mg. of trisodium salt of ethylene diamine tetraacetic acid and from about 10 mg. to about 1000 mg. of disodium salt of ethylene diamine tetraacetic acid.

The suppository dosage form may be, for example, of carbowax or glycerin and is prepared following the conventional techniques of the pharmaceutical chemist involving dissolving or suspending the active ingredients in water, adding the carbowax or glycerin, heating, pouring into molds and allowing to stand until congealed to give the desired end product.

To prepare the tampon dosage form the active ingredients are dissolved or suspended in a small volume of water, from about 1 to 19 ml., and absorbed into a cylinder of cellulose or hydrophilic polyurethane foam. The water is then evaporated in vacuo or freeze dried to give the impregnated tampon. Cellulose tampons are well known in the art. Conventional polyurethane foams are the reaction product of liquid polyols (polyether or polyester) and a difunctional isocyanate, usually toluene diisocyanate. A catalyst such as tin, an amine, a flowing agent, generally water, and foaming stabilizers are also employed. The required cylinders for tampon use are cut from the prepared foam.

The method in accordance with this invention comprises inserting in an animal organism a composition as described hereinabove in the form of a vaginal suppository and/or impregnated tampon to prevent conception or implantation. Advantageously one vaginal suppository and/or impregnated tampon incorporating the active ingredients, in sufficient amounts as described above, is inserted 1 to 24 hours after exposure to conception. This insertion is preferably repeated about every 24 hours for from 1 to 7 days following initial exposure. When both the suppository and the tampon are used, the suppository is inserted first and then held in position by the tampon. When the vaginal suppository is used alone, a non-impregnated tampon is inserted immediately afterward to hold the contents in place. Carrying out the methods as described above prevents conception or implantation with a minimum of side effects.

The following examples illustrate the preparation of compositions of this invention and as such are not to be considered as limiting the invention set forth in the claims appended hereto.

EXAMPLE 1

Glycerin ------------------------------ 3.5
Gelatin, granular -------------------- 1.0
Water plus:
    (a) 10 μg. oxytocin
    (b) 110 mg. adenosine triphosphate disodium salt
    (c) 72 mg. trisodium salt of ethylene diamine tetraacetic acid
    (d) 67 mg. disodium salt of ethylene diamine tetraacetic acid ---------------- 0.5

The active ingredients (a), (b), (c) and (d) are dissolved or suspended in water to make up 10% of the total weight. The glycerin is added, mixing carefully to exclude incorporation of air bubbles. The mixture is heated on a water bath, the gelatin is added and then stirred until the gelatin is dissolved. This mixture is poured into chilled non-lubricated molds and allowed to stand until congealed to give a vaginal suppository.

EXAMPLE 2

Ingredients:                                G./Suppository
Carbowax polyethylene glycol 6000 ---------- 2.5
Carbowax polyethylene glycol 1540 ---------- 1.5
Water plus:
    (a) 10 μg. oxytocin
    (b) 110 mg. adenosine triphosphate disodium salt
    (c) 72 mg. trisodium salt of ethylene diamine tetraacetic acid
    (d) 67 mg. disodium salt of ethylene diamine tetraacetic acid ---------------- 1.0

The carbowax suppositories are prepared following the procedure described in Example 1.

EXAMPLE 3

| Ingredients: | G./Tampon |
|---|---|
| Water plus: | |
| (a) 10 μg. oxytocin | |
| (b) 110 mg. adenosine triphosphate disodium salt | |
| (c) 72 mg. trisodium salt of ethylene diamine tetraacetic acid | |
| (d) 67 mg. disodium salt of ethylene diamine tetraacetic acid | 5 |

The active ingredients (a), (b), (c) and (d) are dissolved or suspended in water and absorbed into a cylinder of cellulose or hydrophilic polyurethane foam measuring about 1.5 inches in diameter and about 3 inches in length. The water is then evaporated in vacuo or freeze dried and the impregnated cylinder is used as a vaginal tampon.

What is claimed is:

1. A contraceptive composition in the form of a vaginal suppository or impregnated tampon comprising:
   (a) from about 1 μg. to about 1000 μg. of oxytocin,
   (b) from about 1 mg. to about 1000 mg. of adenosine triphosphate disodium salt,
   (c) from about 10 mg. to about 1000 mg. of trisodium salt of ethylene diamine tetraacetic acid and
   (d) from about 10 mg. to about 1000 mg. of disodium salt of ethylene diamine tetraacetic acid.

2. A contraceptive composition according to claim 1 in which the form is a vaginal suppository.

3. A contraceptive composition according to claim 1 in which the form is an impregnated tampon.

4. A contraceptive composition according to claim 3 in which the impregnated tampon is cellulose.

5. A contraceptive composition according to claim 3 in which the impregnated tampon is polyurethane foam.

6. A contraceptive composition according to claim 1 in which the amount of (a) is 10 μg., (b) is 100 mg., (c) is 72 mg. and (d) is 67 mg.

7. The method of reducing the number of litters produced by litter-bearing female animals which comprises inserting in the vagina of said females, 1 to 24 hours after mating, and repeating the insertion about every 24 hours for from 1 to 7 days following said mating, a composition in the form of a vaginal suppository or impregnated tampon each comprising:
   (a) from about 1 μg. to about 1000 μg. of oxytocin,
   (b) from about 1 mg. to about 1000 mg. of adenosine triphosphate disodium salt.
   (c) from about 10 mg. to about 1000 mg. of trisodium salt of ethylene diamine tetraacetic acid and
   (d) from about 10 mg. to about 1000 mg. of disodium salt of ethylene diamine tetraacetic acid.

8. The method according to claim 7 in which both the suppository and tampon are inserted.

9. The method according to claim 7 in which the suppository is inserted.

10. The method according to claim 7 in which the tampon is inserted.

11. The method according to claim 7 in which the amount of (a) is 10 μg., (b) is 110 mg., (c) is 72 mg. and (d) is 67 mg.

References Cited

UNITED STATES PATENTS

| 3,277,073 | 10/1966 | Boissonnas | 424—177 X |
| 3,429,308 | 2/1969 | Russell | 424—14 X |

OTHER REFERENCES

Berde, B. et al. Acta Endocrinol. 27: 314-324 (1958) "Comparison of Substances Related to Oxytocin; a New Test."

Chem. Abstracts 52: 9428a (1958).

SHEP K. ROSE, Primary Examiner

U.S. Cl. X.R.

128—270, 271; 424—14, 16, 177